D. NEWBROUGH.
Churn.
No. 27,377.
Patented March 6, 1860.
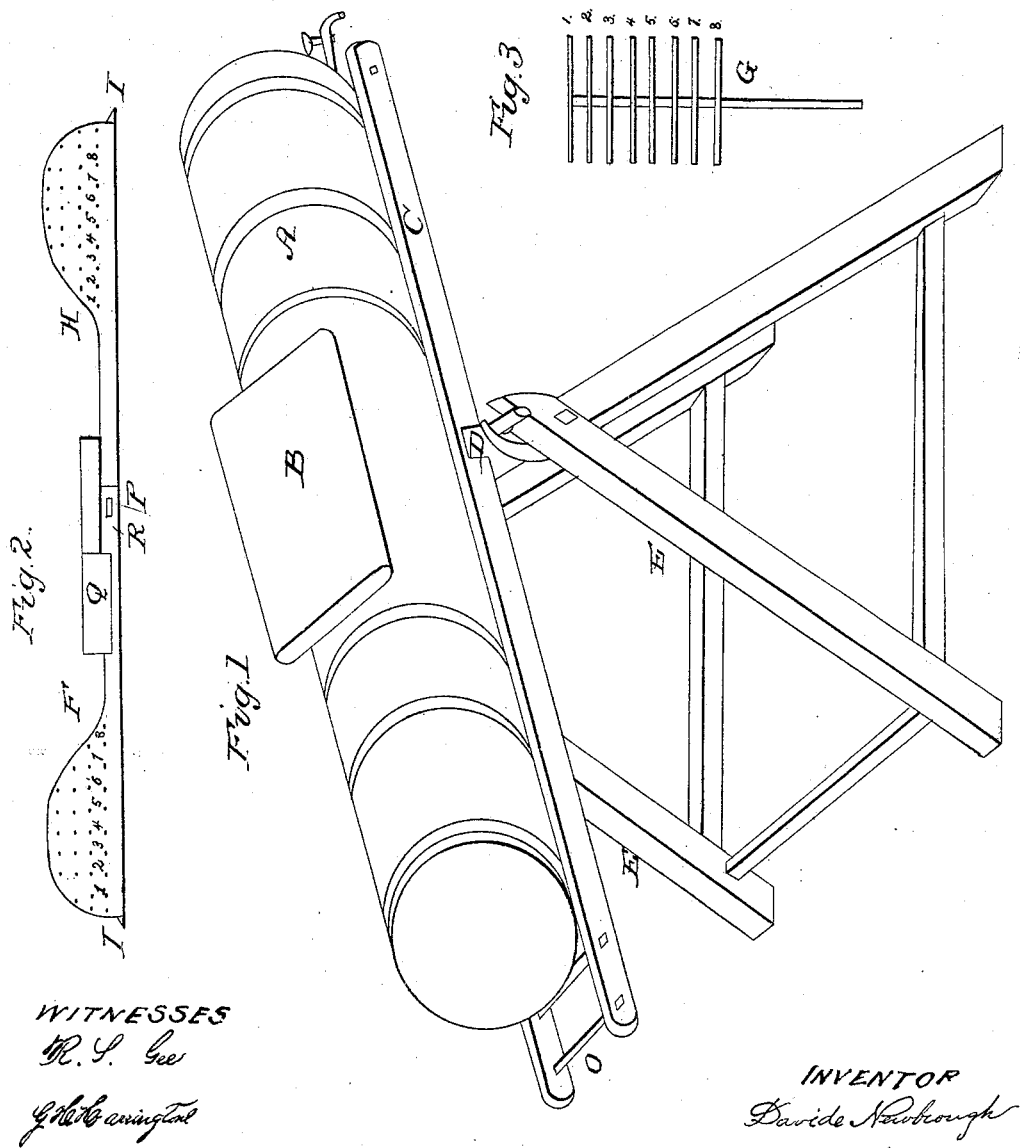
WITNESSES
INVENTOR
Davide Newbrough

UNITED STATES PATENT OFFICE.

DAVID NEWBROUGH, OF CLARKSBURG, INDIANA.

CHURN.

Specification of Letters Patent No. 27,377, dated March 6, 1860.

*To all whom it may concern:*

Be it known that I, DAVID NEWBROUGH, of Clarksburg, in the county of Decatur and State of Indiana, have invented a new and useful Improvement in Churns; and I hereby declare that the following is a full and exact description of the same, reference being had to the accompanying drawings and to the letters of reference marked thereon, like letters referring to like parts.

Figure 1, is an elevation of the churn—swinging in its frame and ready for use. Fig. 2, is a longitudinal side view of the brake frame, together with its coupling in the center; and Fig. 3, is a transverse view of one end of the brake frame, and the brake pins passing through the same.

E, is the frame—after the fashion of a saw-buck—upon which the churn barrel is pivoted.

A, is the churn barrel, that receives the cream or milk, and which may be made of any desirable diameter and length. It operates better to be small in diameter, and of considerable length—say twelve inches diameter, and three or four feet long—as, by this, the moving of its contents from one end to the other a greater velocity is attained, and hence the breaking of the butter globules is more perfect. A spigot, or faucet, is inserted in one end of this barrel, for drawing off the supernatant fluid—or butter-milk, after the process of churning.

B, is a lid, or cover, which closes up the aperture in the top of this churn.

C, is the frame upon which the churn barrel is firmly fastened, and which runs its whole length—protruding slightly at one end.

o, is a cross-pin, or handle, at one end by means of which the churn-barrel is rocked.

F, and H, are the ends of the brake-frame, through which (1 and 8 inclusive) pins pass transversely. These pins serve to brake the globules of the cream as it rushes from one end of the barrel to the other—(by its own gravity)—when the ends are alternately elevated.

G, (Fig. 3) is a top, edge view of the brake frame, or board.

I, are projecting points at each end of this frame, which pass into staples, loops, or recesses at each end of the barrel, and so, serve the purpose of holding it steady.

R, is the key, by which the brake ends, F, and H, are locked together at the center joint P.

Q, is a diagonally arranged board, or gatherer, which performs the function of collecting the globules of butter, after the churning is completed.

Now, the operation of my machine is as follows, viz: The cream being placed in the barrel A, (after the brake is in its place, in the center) the operator takes hold of the handle, o, and elevates that end to an angle of forty degrees, (the barrel bearing its weight upon the frame E, at the point D,) then drops the elevated end so as to raise the other to an equal altitude;—this motion is repeated in quick succession until the process of churning is completed. The rationale of this process is—that the gravity of the cream, or milk, causes it to rush violently from one end of the barrel to the other, and thus—as it dashes through the meshes of the brake-pins the butter globules (of the cream) are broken, and the butter liberated in a granular form, and these myriads of granules are afterward aggregated in a solid butter mass by the gatherer.

To "gather" the butter, the barrel must be rocked the same as in churning—with this exception—that it must be done very slowly. The slow rocking causes eddies around the gatherer in the center, and so invites the butter particles to accumulate there.

I am aware that "D. F. Hite," and "John McLaughlin" have preceded me in the invention of oscillating churns—hinged upon a frame in the center—similar to mine. But, a close observation will show that each of these has a perforated board in the center—crossing the cream box transversely as a diaphragm, and these perforated boards act as brakes on the contents. Neither of these do I claim, as it may not be improper here to state that my brakes are placed at the ends of my churn, and so, has the additional advantage over theirs of increased velocity given to the cream before it reaches the brakes in mine.

Having thus fully described my invention, what I claim as new and desire to secure by Letters Patent, is—

A churn, constructed substantially as herein described and specified;—that is to say—with a cream receptacle A,—brakes F, and H, with gatherer, Q; when these several parts are constructed and arranged for operation conjointly as, and for the purposes described.

DAVID NEWBROUGH.

Witnesses:
R. S. GEE,
C. A. WRIGHT.